US012780620B2

(12) United States Patent
Mollenthiel et al.

(10) Patent No.: US 12,780,620 B2
(45) Date of Patent: Nov. 3, 2026

(54) METHOD FOR ADAPTING THE LOAD CURVE OF A CRANE TO ITS CONFIGURATION

(71) Applicant: MANITOWOC CRANE GROUP FRANCE, Dardilly (FR)

(72) Inventors: Michael Mollenthiel, Villeurbanne (FR); Philippe Boyat, Civrieux (FR); Régis Bockor, Lyons (FR)

(73) Assignee: Manitowoc Crane Group France, Dardilly (FR)

( * ) Notice: Subject to any disclaimer, the term of this patent is extended or adjusted under 35 U.S.C. 154(b) by 743 days.

(21) Appl. No.: 17/860,059

(22) Filed: Jul. 7, 2022

(65) Prior Publication Data

US 2023/0010511 A1 Jan. 12, 2023

(30) Foreign Application Priority Data

Jul. 8, 2021 (FR) ....................................... 2107425

(51) Int. Cl.
*B66C 23/90* (2006.01)
*B66C 23/76* (2006.01)

(52) U.S. Cl.
CPC ............ *B66C 23/905* (2013.01); *B66C 23/76* (2013.01)

(58) Field of Classification Search
CPC ....... B66C 23/905; B66C 23/76; B66C 23/34; B66C 13/22; B66C 13/18; B66C 13/16; B66C 2700/03; B66C 2700/00; B66C 23/00; B66C 23/828
See application file for complete search history.

(56) References Cited

U.S. PATENT DOCUMENTS 9,126,812 B2 * 9/2015 Abel ..................... B66C 23/905
10,207,904 B2 * 2/2019 Morath ................. B66C 23/905
2012/0101694 A1 4/2012 Morath et al.
2013/0079974 A1 * 3/2013 Stake ...................... B66C 13/46 701/33.1
2017/0036894 A1 * 2/2017 Braun ................... B66C 23/905
2017/0260029 A1 * 9/2017 Edeler ...................... B66C 13/16
2019/0144247 A1 * 5/2019 Albinger ................. B66C 13/16 701/50
2019/0389700 A1 * 12/2019 Krutz ..................... G01G 5/045
(Continued)

FOREIGN PATENT DOCUMENTS

CN 1907836 A 2/2007
CN 103612987 A 3/2014
(Continued)

OTHER PUBLICATIONS

Search Report issued in connection with FR Pat. Appl. 21/07425, dated Mar. 22, 2022.

*Primary Examiner* — Erin M Piateski
*Assistant Examiner* — Hajar Hassaniardekani
(74) *Attorney, Agent, or Firm* — Cook Alex Ltd.

(57) ABSTRACT

An adaptation method is provided for adapting a load curve of a crane to a configuration of the crane, wherein the configuration of the crane is associated with a plurality of crane parameters among which a selection of at least one preferential parameter may be operated. The adaptation method includes implementing a determination of a preferential load curve from among a plurality of load curves calculated as a function of the selected preferential parameter.

11 Claims, 3 Drawing Sheets

(56) References Cited

U.S. PATENT DOCUMENTS

| | | | | |
|---|---|---|---|---|
| 2022/0185636 | A1* | 6/2022 | Roni-Damond | B66C 23/34 |
| 2023/0399207 | A1* | 12/2023 | Eggert | B66C 23/905 |

FOREIGN PATENT DOCUMENTS

| | | | |
|---|---|---|---|
| DE | 3341287 | A1 | 6/1984 |
| EP | 0849213 | A1 | 6/1998 |
| FR | 2889513 | A1 | 2/2007 |
| WO | 20160201294 | A1 | 12/2016 |

* cited by examiner

METHOD FOR ADAPTING THE LOAD CURVE OF A CRANE TO ITS CONFIGURATION

FIELD

The invention concerns an adaptation method for adapting a load curve of a crane to a configuration of the crane as well as the crane on which this adaptation method is implemented.

BACKGROUND

A crane, and more specifically a tower crane, is a lifting and handling device generally used on infrastructure and building construction sites. In general, the movements performed by the crane are the lifting and the lowering of a load or the dispensing of the load by displacement of a carriage on a jib.

In order to be able to define a maximum load value for the use of the crane at different crane spans according to various parameters such as wind resistance, for example, a crane user may rely on a graph determined during the design of the crane and which shows the variation of the maximum load of use of the crane as a function of the use range of the crane called load curve.

A tower crane usually has a unique load curve for a given jib length and a given reeve block.

When designing the crane, a load curve is calculated for each length value of jibs and for each type of reeve block, taking into account the most unfavorable case in terms of mechanical strength or of stability of the crane. This unfavorable case may for example correspond to use of the crane at a maximum height of use.

Therefore, the user of the crane has only a unique load curve for a given jib length. According to this load curve, other parameters of the crane, such as a composition of a pylon, a ballast mass etc., may be deduced.

It should be then understood that, for a given crane, the load curve does not vary according to the composition of the pylon for example, but that the composition of the pylon varies in order to satisfy the load curve.

For a given use height of the crane, the load curve defines a maximum use load value according to the use span of the crane. If it is desired to use the crane at a greater height, then two solutions exist: either to reduce the load of use of the crane and in this case, a risk of using the crane below of its actual lifting capacities is faced, or to modify the structure of the pylon and consequently to modify the configuration of the crane in order to use reinforced pylon elements to lift the same load, and in which case the cost of use of the crane is considerably increased.

Methods are known for adapting a parameter of the crane to a configuration of the crane. For example, document WO 2016/201294 describes a system and method for calculating a crane capacity for a crane having a variable position counterweight at an intermediate position in which a jib combination is determined and a maximum capacity at the level of a hook position is determined for this arrow combination. However, the method and the device described in document WO 2016/201294 do not simply and centrally allow the crane to be controlled according to the operating conditions of the crane.

SUMMARY

The present invention aims at solving all or part of the aforementioned drawbacks.

The technical problem underlying the invention consists in particular in adapting a load curve of a crane to a configuration of the crane in a simple and economical manner, while allowing simple and centralized control of the crane according to the operating conditions of the crane.

To this end, the subject of the present invention is an adaptation method for adapting a load curve of a crane to a configuration of the crane, the configuration of the crane being associated with a plurality of crane parameters among which a selection of at least one preferential parameter could be operated, the adaptation method implementing a determination of a preferential load curve from among a plurality of load curves calculated as a function of the selected preferential parameter, the adaptation of the load curve to the configuration of the crane according to the preferential parameter is carried out by a monitoring-control system included in a processing unit included in the crane, the processing unit being arranged, on the one hand, so as to monitor actuators of the crane and, on the other hand, to calculate the plurality of load curves and to store the plurality of load curves in a memory unit included in the processing unit.

The adaptation method may also have one or several feature(s) of the following features, considered alone or in combination.

The plurality of crane parameters may include a height of a mast, a ballast mass, a mast composition, and the preferential parameter refers to a preferred mast height or a preferred mast composition or a preferred ballast mass or a preferred ballast capacity.

The mast composition may refer to a choice of a number of reinforced or unreinforced mast elements included in the mast.

The calculation of the plurality of load curves may be performed by fixing a value of the preferential parameter and by varying values of the crane parameters other than the preferential parameter.

According to one possibility, the configuration of the crane is associated with a plurality of crane parameters among which a selection of at least two preferential parameters may be operated.

According to one possibility, the plurality of load curves are preloaded in a memory unit included in the crane according to a specific request from the user of the crane.

By "a specific user request" it should understood a user's request intended to configure the crane in a specific crane configuration based on a specific parameter combination including a selection of one or several preferential parameter (s).

In the described adaptation method, in addition to the preferential load curve, a preferential value may be generated for at least one crane parameter other than the preferential parameter according to the selected preferential parameter and according to a specific request from the user of the crane.

The specific user request may include a definition of a parameter of a site on which the crane is installed.

A site parameter is a parameter external to the crane and having an impact on the definition of the configuration of the crane for its installation on the construction site.

For example, a site parameter may include admissible reactions to the ground, taking into account a local wind linked to a geographical position and to an environment of a construction site on which the crane is assembled, etc.

A consistency monitoring may be operated between the actual crane configuration, in other words the crane configuration in use at the time of operation of the crane and the preferential crane configuration including the preferential parameter and which is generated by the processing unit according to the user's specific request.

According to one possibility, the consistency monitoring between the actual crane configuration and the preferential crane configuration is performed through a manual check by a user or an assembler of the crane.

The manual check may for example correspond to a measurement of the ballast mass and to a comparison of this ballast mass with that indicated by the processing unit.

According to one implementation, the consistency monitoring between the actual crane configuration and the theoretical crane configuration is performed automatically by monitoring the crane assembly parameters fed back to the processing unit by radio-communication components placed on elements of the crane.

The radio-communication components may for example refer to RFID tags placed on the elements of the mast of the crane.

The invention also concerns a crane having a crane configuration and operating according to a load curve, comprising:

- a selection interface through which may be operated a selection of a preferential parameter from among a plurality of crane parameters with which is associated the crane configuration;
- a processing unit configured to implement the adaptation method described above.

BRIEF DESCRIPTION OF THE DRAWINGS

The invention will be better understood with the aid of the detailed description that is disclosed hereinbelow with reference to the appended drawings in which.

In the following detailed description of the figures defined hereinabove, the same elements or the elements filling identical functions may keep the same reference numerals in order to simplify the understanding of the invention.

DESCRIPTION

The invention concerns an adaptation method for adapting a load curve of a crane, and in particular a tower crane, to a configuration of the crane associated with a plurality of crane parameters such as a height of a mast HM, a ballast mass ML, a mast composition CM.

The mast composition CM may refer to a choice of a number of reinforced ER or non-reinforced ENR mast elements included in the mast.

In general, a tower crane has a single load curve per jib length and per reeving.

For each crane model, a point of the load curve is calculated for each jib length, i.e. a point of the load curve per working range R of the crane is obtained, and for each type of carriage, for the calculation of each point of the load curve, the most unfavorable case in terms of mechanical strength or stability of the crane is considered. In general, this unfavorable case corresponds to a maximum height under hook HM, or to specific mast compositions.

Thus, during the lifetime of the crane, for a given jib configuration, and taking into account the fact that the crane is equipped with only one type of carriage per crane model, a crane operator has only a unique load curve that models the operation of his crane.

Advantageously, for the unique load curve relating to each jib configuration, the mast compositions are deduced according to the bases and operating conditions of the crane such as standards, wind, earthquake, anchorage, etc.

A dependency exists therefore between the configuration of the crane and its load curve. However, the load curve does not vary according to the configuration of the mast of the crane, but it is rather the composition of the mast which is deduced from the load curve.

In order to enable the crane to operate at a greater height under hook HM, the crane operator must use reinforced masts or larger masts, which implies that the cost of the crane increases considerably.

And when the crane operates at a height under hook HM that is lower than the maximum possible height, it is possible that the crane may advantageously benefit from a higher load curve without making any material changes to the crane, in other words without adding new elements, such as reinforced masts and without changing the composition of the mast.

Figure 1:
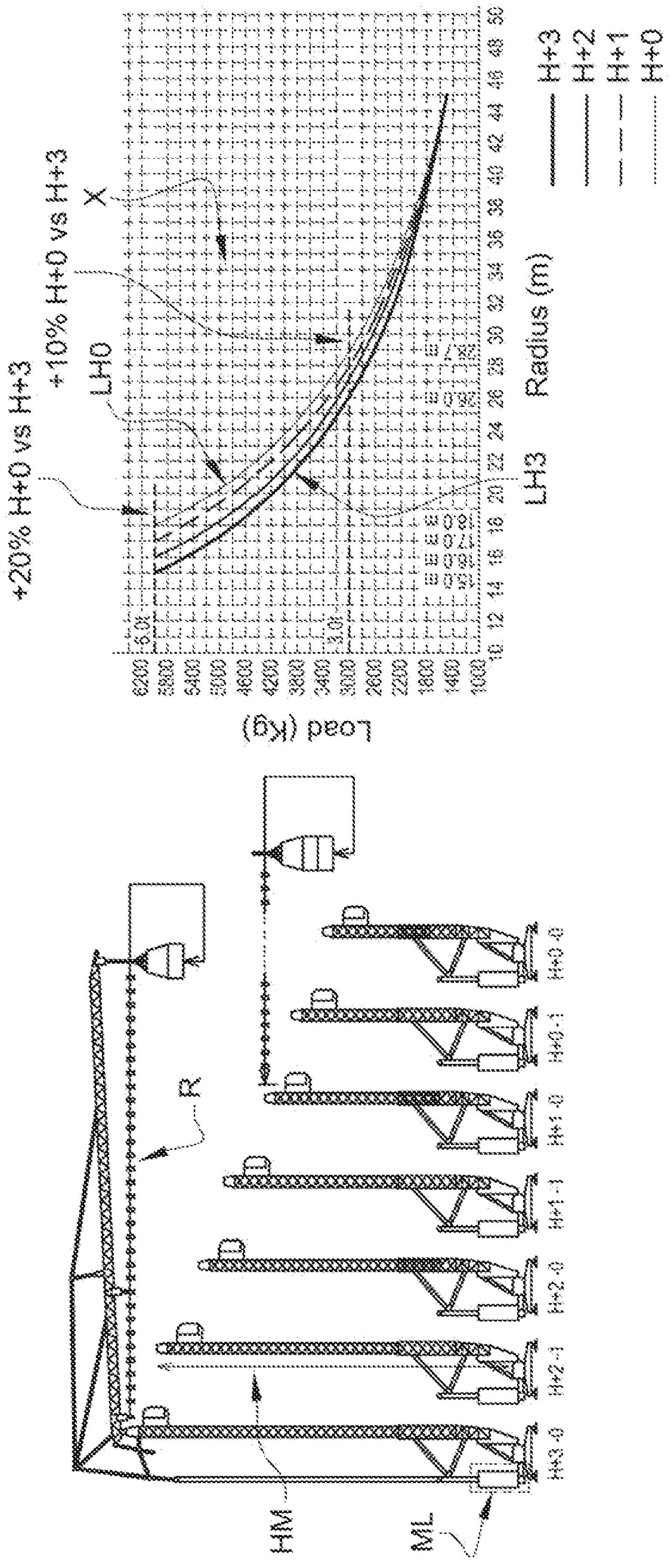
FIG. 1 is a schematic representation representing a variation in the load of the crane as a function of a mast height, as well as different load curves corresponding to the different mast heights for the same base ballast.

FIG. 1 presents an example of variation of the load lifted by the crane, and consequently of the load curve of this crane, as a function of the working height of the crane, for a given crane model, as well as the corresponding load curves respectively at each crane height. The load curves LH0 and LH3 correspond respectively to crane heights H0 and H3 for example. An increase in the load curve may be observed when the height under hook HM decreases. For example, for a load range R of 18 meters, the height under hook H3 makes it possible to lift a load approximately 25% lower than for the height under hook H0 lower than the height under hook H3.

Advantageously, the invention makes it possible to obtain a load curve of the crane adapted to the operation of the crane for each operating height of the crane, in addition to obtaining a load curve for each working range R of the crane.

Advantageously, the invention allows the user of the crane to adapt the configuration of the crane, in order to:

- increase the lifting height of the load of the crane by reducing the load curve;
- reduce the reactions of the crane on the ground by reducing the load curve;
- for a given lifting height, reduce the use of reinforced masts by reducing the load curve;
- for a given lifting height, reduce the use of ballasts by reducing the load curve;
- increase the load curve to increase the load lifted by the crane when the height under hook HM is lower than the maximum height;
- or a combination of all the pre-described cases.

Figure 2:
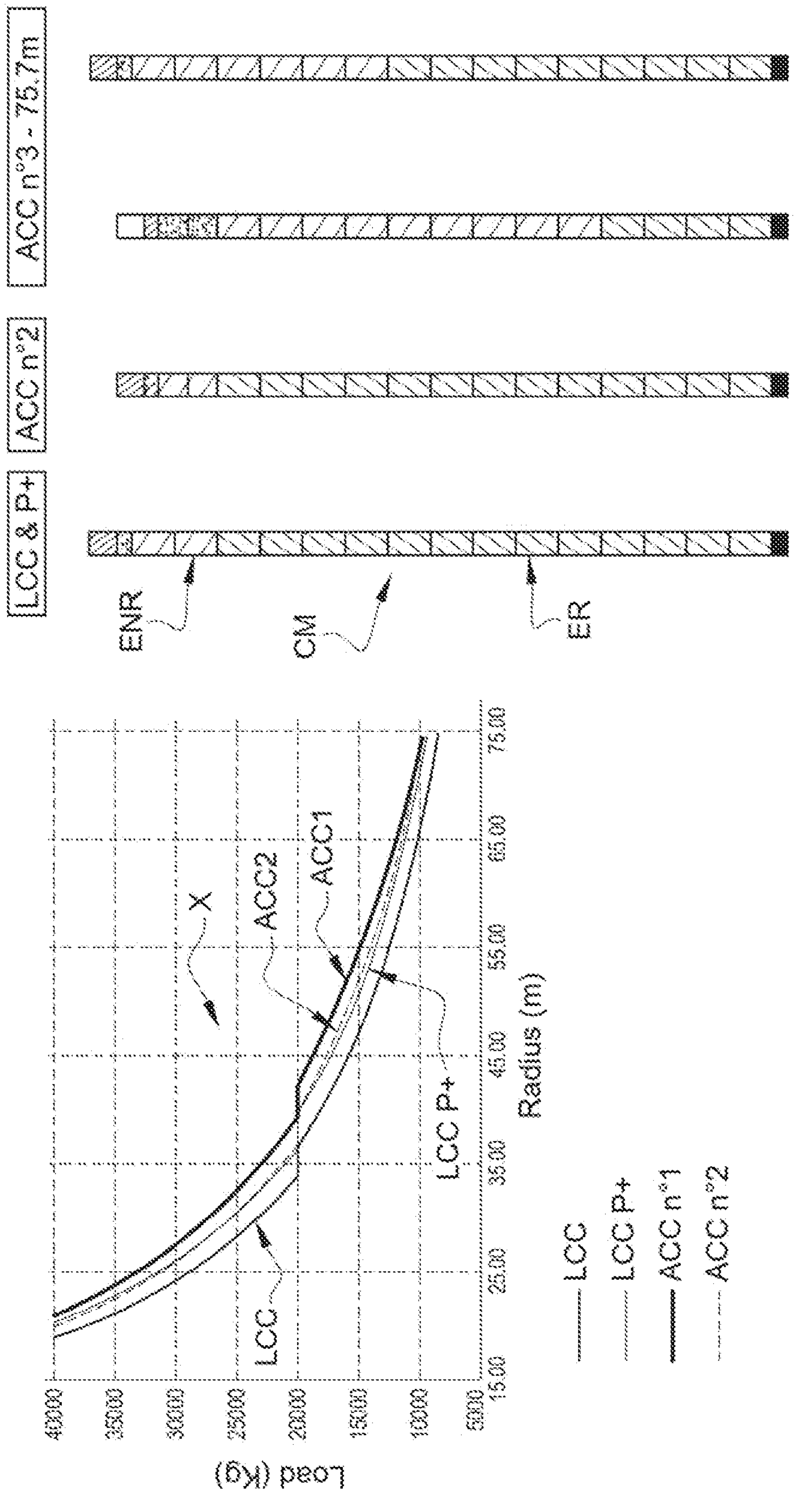
FIG. 2 is a graphical representation representing, for a predefined crane model, a plurality of load curves of said crane as well as a mast composition corresponding to each load curve.

FIG. 2 presents several load curves for a given crane model as well as the composition of the mast corresponding to each load curve.

For example, for the two load curves referred to on FIG. 2 respectively as LCC and LCC P+, the composition of the mast allows a height under hook HM of up to 79 m with 13 reinforced masts and 2 regular masts.

FIG. 2 also shows that it is possible to have modified and in particular increased load curves by modifying the composition parameters of the mast:

The curve referred to as ACC2 which allows a maximum height under hook HM of 75.7 m, with a composition of the mast of maximum 4 reinforced masts for this height under hook.

The curve referred to as ACC1 which allows a maximum height under hook HM of 75.7 m, without limiting the number of reinforced masts.

Among the crane parameters associated with the configuration of the crane, a selection of at least one preferential parameter such as a preferred mast height or a preferred mast composition or a preferred ballast mass or a preferred ballast capacity may be operated, and the adaptation method implements a determination of a preferential load curve from among a plurality of load curves X calculated as a function of the selected preferential parameter.

The calculation of the plurality of load curves X may be carried out by fixing a value of the preferential parameter and by varying values of the crane parameters other than the preferential parameter.

According to one possibility, the configuration of the crane is associated with a plurality of crane parameters among which a selection of at least two preferential parameters may be operated.

In addition to the preferential load curve, a preferential value may be generated for at least one crane parameter other than the preferential parameter according to the selected preferential parameter and according to a specific request from the user of the crane.

If, for example, a maximum base ballast value is chosen as the preferential parameter, then FIG. 1 represents the potential gain on the load curves as a function of the working height of the crane.

The adaptation of the load curve to the configuration of the crane according to the preferential parameter may be carried out by a monitoring-control system included in a processing unit included in the crane, the processing unit being arranged, on the one hand, so as to monitor actuators of the crane and, on the other hand, to calculate the plurality of load curves X and to store the plurality of load curves X in a memory unit included in the processing unit.

Advantageously, this makes it possible to centralize in the processing unit both the control of the actuators of the crane and the storage of the plurality of load curves X, in order to simply and centrally allow the user to control the crane actuators according to the operating conditions of the crane.

The plurality of load curves may be pre-loaded into a memory unit included in the crane according to a specific request from the user of the crane.

By "a specific user request" it should be understood a user's request intended to configure the crane in a specific crane configuration based on a specific parameter combination including a selection of one or several preferential parameter(s).

The user's specific request may also include a definition of a parameter of a site on which the crane is installed.

A site parameter is a parameter external to the crane and having an impact on the definition of the configuration of the crane for its installation on the construction site.

For example, a site parameter can include admissible reactions on the ground, taking into account a local wind linked to a geographical position and to an environment of a construction site on which the crane is assembled, etc.

According to one possibility, the most relevant load curves for the user are determined according to the known or requested use cases, and these relevant load curves are preloaded into the memory unit of the monitoring-control system.

By "known use cases", it should be understood, for a given crane model, that a crane manufacturer may have a good knowledge and mastery of the crane configurations relating to defined heights under hook and ballast mass values, or for a given crane model, that the crane manufacturer may also have identified a need to limit the number of reinforced masts.

Advantageously, the invention makes it possible to identify the needs of users of the crane and to develop a program implemented by a computer in order to adapt the configuration of the crane according to the load curves of the crane and vice versa.

According to an implementation of the described adaptation method, the most relevant load curves, in other words selected according to the needs of the user of the crane, are recorded in the memory unit of the monitoring-control system, and the crane's user has the option of activating these load curves according to his needs.

According to another implementation of the adaptation method, the user or the manufacturer of the crane may generate the configuration of the crane and the load curve adapted to a specific request from the user of the crane. A new load curve with specific mast composition and reaction table, which will be programmed by the crane installer directly on the crane during its installation, may be created.

According to an implementation of the adaptation method, a consistency monitoring may be operated between the actual crane configuration, in other words the crane configuration in use at the time of operation of the crane and the preferential crane configuration including the preferential parameter and which is generated by the processing unit according to the user's specific request.

The consistency monitoring between the actual crane configuration and the preferential crane configuration may be performed through a manual check by a user or an assembler of the crane.

The manual check may for example correspond to a measurement of the ballast mass and to a comparison of this ballast mass ML with that indicated by the processing unit.

According to one implementation, the consistency monitoring between the actual crane configuration and the theoretical crane configuration may be performed automatically by the monitoring-control system by monitoring the crane assembly parameters fed back to the processing unit by radio-communication components placed on elements of the crane.

The radio-communication components may for example refer to RFID tags placed on the elements of the mast of the crane.

Figure 3:
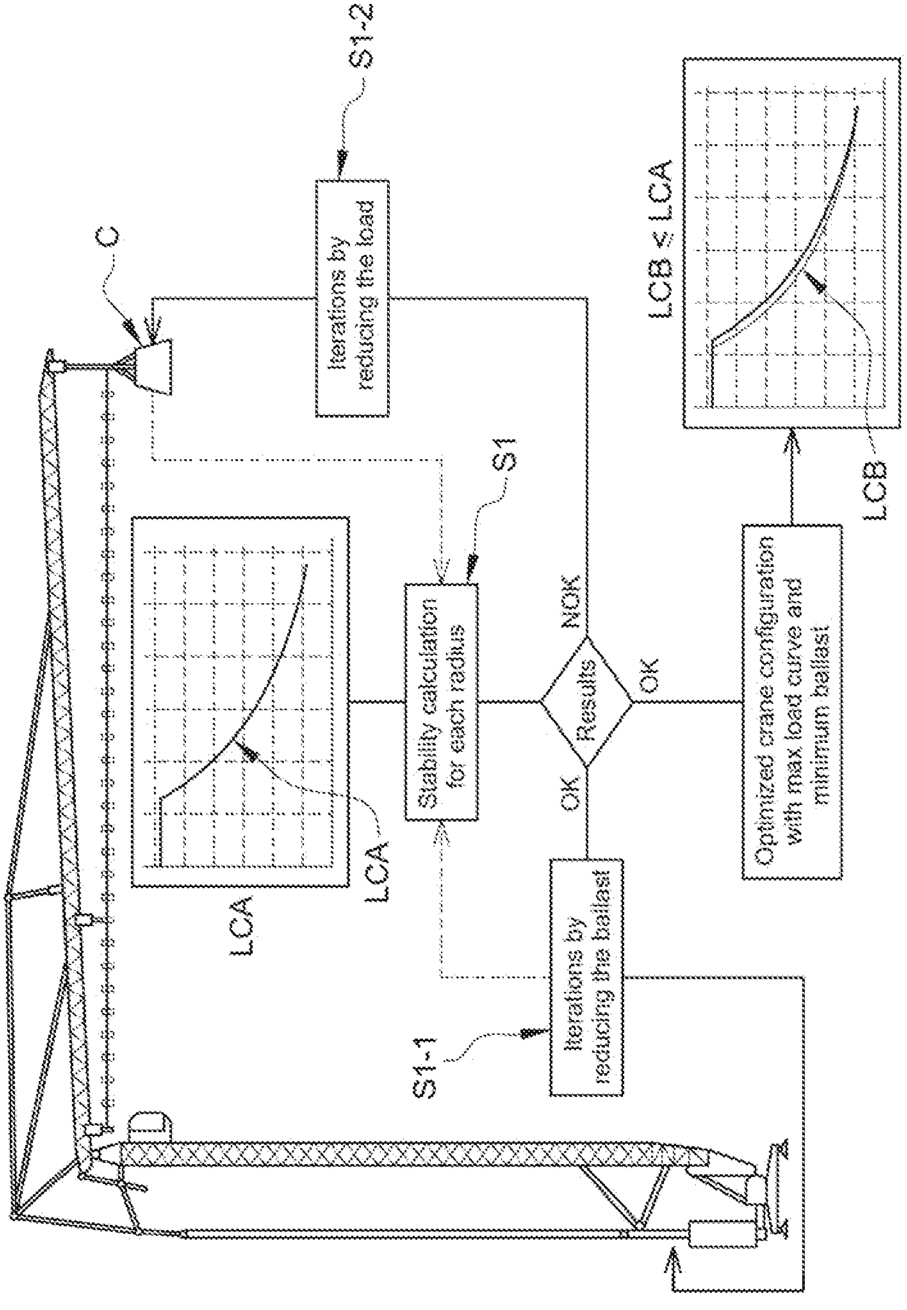
FIG. 3 is a schematic representation of a method for adapting a load curve of the crane after checking the stability of the crane.

The described adaptation method may also include a step S1 for checking the stability of the crane represented in FIG. 3.

This stability checking step may include the following sub-steps:

a variation S1-1 of a ballast mass ML for a given crane configuration; and a variation S1-2 of the load C lifted by the crane for the given crane configuration;

and this in order to achieve:

obtaining an appropriate load curve LCB following the variation of the ballast mass and of the load lifted when the stability of the crane is checked.

As an example, in FIG. 3, for the same crane configuration, the obtained adapted load curve LCB is lower than the initial load curve LCA.

Advantageously, the described adaptation method makes the cranes more efficient and adaptive without adding additional equipment at a lower cost.

The invention also concerns the crane that has the crane configuration and operating according to a load curve, including:

- a selection interface through which may be operated the selection of the preferential parameter from among the plurality of crane parameters with which is associated the crane configuration;
- the processing unit configured to calculate the plurality of load curves X and to adapt the load curve of the crane to the crane configuration through the determination of the preferential load curve from among the plurality of load curves X according to the selected preferential parameter.

The processing unit may include:

- the monitoring-control system executing the adaptation of the load curve to the crane configuration according to the selected preferential parameter;
- the memory unit storing the plurality of load curves X calculated by the processing unit and from which is determined the preferential load curve.

Although the invention has been described in connection with the particular embodiments, it is obvious that it is not limited thereto and that it encompasses all technical equivalents of the described means as well as their combinations where these fall within the scope of the invention.

The invention claimed is:

1. A method of lifting a load by a tower crane according to a load curve, wherein the tower crane comprises a mast, a jib, and a selection interface, the method comprising:

adapting the load curve of the tower crane to a configuration of the tower crane, the configuration of the tower crane being associated with a plurality of tower crane parameters from which a selection of at least one preferential parameter is operated, wherein adapting the load curve comprises manually selecting a preferential parameter and a value of the preferential parameter by entering the preferential parameter and the value of the preferential parameter into the selection interface;

calculating a plurality of load curves as a function of the preferential parameter and the value of the preferential parameter;

determining a preferential load curve from among the plurality of load curves calculated as a function of the selected preferential parameter and the value of the preferential parameter, wherein the adaptation of the load curve to the configuration of the tower crane as a function of the preferential parameter and the value of the preferential parameter is carried out by a monitoring-control system included in the processing unit included in the tower crane, the processing unit being configured to monitor actuators of the tower crane and to calculate the plurality of load curves and to store the plurality of load curves in a memory unit included in the processing unit; operating the tower crane in accordance with the preferential load curve; and wherein the plurality of tower crane parameters includes a height of a mast, a ballast mass, a mast composition, and the preferential parameter includes a preferred mast height, a preferred mast composition, a preferred ballast mass, and a preferred ballast capacity.

2. The method according to claim 1, wherein the mast composition refers to a choice of a number of reinforced or unreinforced mast elements included in the mast.

3. The method according to claim 1, wherein the calculation of the plurality of load curves is performed by fixing a value of the preferential parameter and by varying values of the tower crane parameters other than the preferential parameter.

4. The method according to claim 1, wherein the configuration of the tower crane is associated with the plurality of tower crane parameters from which a selection of at least two preferential parameters is operated.

5. The method according to claim 1, wherein the plurality of load curves is preloaded into the memory unit included in the tower crane as a function of a specific request from a user of the tower crane.

6. The method according to claim 1, wherein, in addition to the preferential load curve, a preferential value is generated for at least one tower crane parameter other than the preferential parameter according to the selected preferential parameter and according to a specific request from a user of the tower crane.

7. The method according to claim 6, wherein the plurality of load curves is preloaded into the memory unit included in the tower crane as a function of a specific request from the user of the tower crane, and wherein the user's specific request includes a definition of a parameter of a site on which the tower crane is installed.

8. The method according to claim 1, wherein a consistency monitoring is operated between an actual tower crane configuration and a preferential tower crane configuration including the preferential parameter and which is generated by the processing unit as a function of a user's specific request.

9. The method according to claim 8, wherein the consistency monitoring between the actual tower crane configuration and the preferential tower crane configuration is performed through a manual check by the user or an assembler of the tower crane.

10. The method according to claim 9, wherein the consistency monitoring between the actual tower crane configuration and the preferential tower crane configuration is automatically performed by monitoring the tower crane parameters fed back to the processing unit by radio-communication components placed on elements of the tower crane.

11. A tower crane having a tower crane configuration and operating according to a load curve, comprising:

a mast, a jib, and a ballast operating according to a preferential load curve;

a selection interface through which a preferential parameter and a value of the preferential parameter is manually selected from among a plurality of tower crane parameters with which is associated the tower crane configuration; and a processing unit configured to implement an adaptation method for adapting a load curve of a tower crane to a configuration of the tower crane, the adaptation method implementing a determination of the preferential load curve from among a plurality of load curves calculated as a function of the selected preferential parameter and the value of the preferential parameter, wherein the adaptation of the load curve to the configuration of the tower crane as a function of the preferential parameter and the value of the preferential parameter is carried out by a monitoring-control system included in a processing unit included in the tower crane, the processing unit being configured to monitor actuators of the crane and to calculate the plurality of load curves and to store the plurality of load curves in a memory unit included in the processing unit; and wherein the plurality of tower crane parameters includes a height of a mast, a ballast mass, a mast composition, and the preferential parameter includes a preferred mast height, a preferred mast composition, a preferred ballast mass, and a preferred ballast capacity.

* * * * *